United States Patent
Pale et al.

(10) Patent No.: US 9,630,451 B2
(45) Date of Patent: Apr. 25, 2017

(54) METHOD OF MANUFACTURING HOLLOW AXLE SHAFT FOR A VEHICLE

(71) Applicant: American Axle & Manufacturing, Inc., Detroit, MI (US)

(72) Inventors: John A. Pale, Troy, MI (US); David I. Alexander, Beverly Hills, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 109 days.

(21) Appl. No.: 14/307,898

(22) Filed: Jun. 18, 2014

(65) Prior Publication Data

US 2015/0367680 A1 Dec. 24, 2015

(51) Int. Cl.
| | |
|---|---|
| *F16C 3/02* | (2006.01) |
| *B60B 35/14* | (2006.01) |
| *B21D 19/00* | (2006.01) |
| *B21J 5/08* | (2006.01) |
| *B21K 23/04* | (2006.01) |

(Continued)

(52) U.S. Cl.
CPC .............. *B60B 35/14* (2013.01); *B21D 19/00* (2013.01); *B21J 5/08* (2013.01); *B21K 1/063* (2013.01); *B21K 1/066* (2013.01); *B21K 21/12* (2013.01); *B21K 21/14* (2013.01); *B21K 23/04* (2013.01); *B60B 35/12* (2013.01); *B21D 19/046* (2013.01); *B21J 9/08* (2013.01); *B60B 27/065* (2013.01); *B60B 2310/208* (2013.01);
(Continued)

(58) Field of Classification Search
CPC ..... B21J 15/08; B21J 9/08; B21J 5/08; B21K 1/063; B21K 1/066; B21K 21/12; F16C 3/02; B21D 19/00; B21D 19/046; B21D 19/08; B21D 19/088; B21D 19/10; B21C 1/24
See application file for complete search history.

(56) References Cited

U.S. PATENT DOCUMENTS

| | | |
|---|---|---|
| 209,883 A | 11/1878 | Graser |
| 353,929 A | 12/1886 | Fitzgerald |

(Continued)

FOREIGN PATENT DOCUMENTS

| | | |
|---|---|---|
| EP | 1 839 772 A1 | 10/2007 |
| FR | 446 937 A | 12/1912 |

(Continued)

OTHER PUBLICATIONS

International Search Report for Application No. PCT/US2015/036204 dated Sep. 29, 2015, 5 pages.
(Continued)

*Primary Examiner* — Jermie Cozart
(74) *Attorney, Agent, or Firm* — Howard & Howard Attorneys PLLC

(57) ABSTRACT

A hollow axle shaft for transmitting rotational motion from a prime mover to a wheel of a vehicle comprises an elongated member. The elongated member extends along an axis between a first end and a second end. The hollow axle shaft further comprises a flange at the first end and extending radially away from the axis for receiving the wheel. The flange is integral with the elongated member. A method of manufacturing the hollow axle shaft comprises the step of providing the elongated member comprising a material and defining a bore extending along the axis between the first and second ends, and the step of forming the flange with the material at the first end.

68 Claims, 5 Drawing Sheets

(51) Int. Cl.
   *B21K 1/06* (2006.01)
   *B21K 21/12* (2006.01)
   *B21K 21/14* (2006.01)
   *B60B 35/12* (2006.01)
   *B21J 9/08* (2006.01)
   *B21D 19/04* (2006.01)
   *B60B 27/06* (2006.01)

(52) U.S. Cl.
   CPC .............. *B60B 2310/50* (2013.01); *F16C 3/02* (2013.01); *Y10T 29/49828* (2015.01)

(56) References Cited

U.S. PATENT DOCUMENTS

| | | |
|---|---|---|
| 359,136 A | 3/1887 | Dalzell |
| 649,497 A | 5/1900 | Wales |
| 811,076 A | 1/1906 | Miller |
| 981,697 A | 1/1911 | Simpson |
| 983,849 A | 2/1911 | Wales |
| 1,104,088 A | 7/1914 | Wales |
| 1,417,806 A | 5/1922 | Lapotterie |
| 1,776,855 A | 9/1930 | Holmes |
| 1,822,093 A | 9/1931 | Hendrickson et al. |
| 1,823,158 A | 9/1931 | Mogford et al. |
| 1,873,453 A | 8/1932 | Mogford et al. |
| 1,945,076 A | 1/1934 | Riemenschneider |
| 1,945,077 A | 1/1934 | Riemenschneider |
| 1,945,080 A | 1/1934 | Thoms |
| 1,955,824 A | 4/1934 | Mogford et al. |
| 1,964,258 A | 6/1934 | Graham |
| 1,983,584 A | 12/1934 | Urschel |
| 2,013,786 A | 9/1935 | Mogford et al. |
| 2,019,811 A | 11/1935 | Graham |
| 2,065,595 A | 12/1936 | Lynch |
| 2,124,406 A | 7/1938 | Spatta |
| 2,127,625 A | 8/1938 | Benedetto |
| 2,133,091 A | 10/1938 | Gettig |
| 2,150,948 A | 3/1939 | Spatta |
| 2,313,116 A | 3/1943 | Babcock |
| 2,543,811 A | 3/1951 | Snow et al. |
| 2,569,248 A | 9/1951 | Miller |
| 2,611,656 A | 9/1952 | Vanderberg |
| 2,649,922 A | 8/1953 | Hutchinson et al. |
| 2,667,047 A | 1/1954 | Mennear |
| 2,876,573 A | 3/1959 | Schmidt |
| 3,225,581 A | 12/1965 | Hinderer |
| 3,465,418 A | 9/1969 | Clark et al. |
| 3,564,896 A | 2/1971 | Clark et al. |
| 3,631,585 A | 1/1972 | Stamm |
| 3,701,564 A | 10/1972 | Puzik |
| 3,836,272 A | 9/1974 | Duer |
| 3,845,622 A | 11/1974 | Hufstader |
| 3,886,649 A | 6/1975 | Simon |
| 3,968,919 A | 7/1976 | Beijen |
| 4,087,038 A | 5/1978 | Yagi |
| 4,100,781 A | 7/1978 | Zawacki et al. |
| 4,192,167 A | 3/1980 | Huebner et al. |
| 4,198,843 A | 4/1980 | Spence |
| 4,208,900 A | 6/1980 | Zawacki et al. |
| 4,213,351 A | 7/1980 | Rowlinson |
| 4,223,825 A | 9/1980 | Williams |
| 4,261,193 A | 4/1981 | Boik |
| 4,277,969 A | 7/1981 | Simon |
| 4,301,672 A | 11/1981 | Simon |
| 4,435,972 A | 3/1984 | Simon |
| 4,452,063 A | 6/1984 | Sebastiani et al. |
| 4,487,357 A | 12/1984 | Simon |
| 4,551,115 A | 11/1985 | Ferguson |
| 4,659,005 A | 4/1987 | Spindler |
| 4,768,839 A | 9/1988 | Spindler |
| 5,205,464 A | 4/1993 | Simon |
| 5,213,250 A | 5/1993 | Simon |
| 5,303,985 A | 4/1994 | Barnholt et al. |
| 5,711,393 A | 1/1998 | Gage |
| 5,829,911 A | 11/1998 | Yokota et al. |
| 5,946,365 A | 8/1999 | Drillon et al. |
| 6,038,771 A | 3/2000 | Takehara et al. |
| 6,059,378 A | 5/2000 | Dougherty et al. |
| 6,083,108 A | 7/2000 | Grubish |
| 6,230,540 B1 | 5/2001 | Wilch et al. |
| 6,327,771 B1 | 12/2001 | Anglin et al. |
| 6,439,672 B1 | 8/2002 | Simon |
| 6,530,859 B2 | 3/2003 | Boston et al. |
| 6,557,947 B1 | 5/2003 | Hunt |
| 6,572,199 B1 | 6/2003 | Creek et al. |
| 6,698,078 B2 | 3/2004 | Prucher |
| 6,752,560 B2 | 6/2004 | Wilson et al. |
| 6,817,098 B2 | 11/2004 | Yuan |
| 7,412,866 B2 | 8/2008 | Jahani et al. |
| 7,854,438 B2 | 12/2010 | Richardson |
| 8,109,000 B2 | 2/2012 | Zalanca et al. |
| 9,400,009 B2 | 7/2016 | Khanfar |
| 2002/0198075 A1 | 12/2002 | Prucher |
| 2003/0093888 A1 | 5/2003 | Prucher |
| 2003/0221474 A1 | 12/2003 | Sorgi |
| 2004/0060385 A1 | 4/2004 | Prucher |
| 2006/0131949 A1 | 6/2006 | Jahani et al. |
| 2006/0183561 A1 | 8/2006 | Briggs |
| 2010/0068428 A1 | 3/2010 | Derse |
| 2010/0244546 A1 | 9/2010 | Milio et al. |
| 2010/0272504 A1 | 10/2010 | Sheth et al. |
| 2010/0308612 A1 | 12/2010 | Antunes et al. |
| 2013/0207446 A1 | 8/2013 | Marro et al. |
| 2015/0285295 A1 | 10/2015 | Khanfar et al. |
| 2015/0285296 A1 | 10/2015 | Simon et al. |

FOREIGN PATENT DOCUMENTS

| | | |
|---|---|---|
| FR | 2 023 678 A1 | 8/1970 |
| GB | 361308 | 11/1931 |
| GB | 473670 | 10/1937 |
| GB | 479043 | 1/1938 |
| GB | 1135861 | 12/1968 |
| GB | 1183099 | 3/1970 |
| GB | 1 226 740 | 3/1971 |
| GB | 2 319 584 A | 5/1998 |
| KR | 2008-0030821 A | 4/2008 |
| KR | 2013-0013456 A | 2/2013 |
| WO | WO 2005/097520 A1 | 10/2005 |
| WO | WO 2013/116892 A1 | 8/2013 |

OTHER PUBLICATIONS

Machine-Assisted English language translation for FR 446 937 extracted from espacenet.com database on Oct. 14, 2015, 8 pages.
English language abstract not found for FR 2 023 678; however, see English language equivalent GB 1 226 740. Original document extracted from espacenet.com database on Oct. 14, 2015, 7 pages.
European Search Report for Application EP 15 16 2833 dated Aug. 10, 2015, 2 pages.
European Search Report for Application EP 15 16 2837 dated Aug. 11, 2015, 2 pages.
European Search Report for Application EP 15 16 2839 dated Jul. 27, 2015, 2 pages.
International Search Report for Application No. PCT/US2015/024134 dated Jun. 29, 2015, 3 pages.
Written Opinion for Application No. PCT/US2015/024134 dated Jun. 3, 2015, 4 pages.
International Search Report for Application No. PCT/US2015/024135 dated Jun. 29, 2015, 3 pages.
Written Opinion for Application No. PCT/US2015/024135 dated Jun. 3, 2015, 5 pages.
International Search Report for Application No. PCT/US2015/024139 dated Jul. 10, 2015, 3 pages.
Tuzun, Aydin et al., "Analysis of Tube Upsetting—A Thesis Submitted to the Graduate School of Natural and Applied Sciences of Middle East Technical University", Dec. 2004, pp. 1-120.
English language abstract and machine-assisted English translation for KR 2008-0030821 extracted from espacenet.com database on Aug. 18, 2016, 7 pages.

(56) References Cited

OTHER PUBLICATIONS

English language abstract and machine-assisted English translation for KR 2013-0013456 extracted from espacenet.com database on Aug. 18, 2016, 19 pages.
English language abstract and machine-assisted English translation for WO 2005/097520 extracted from espacenet.com database on Aug. 18, 2016, 11 pages.

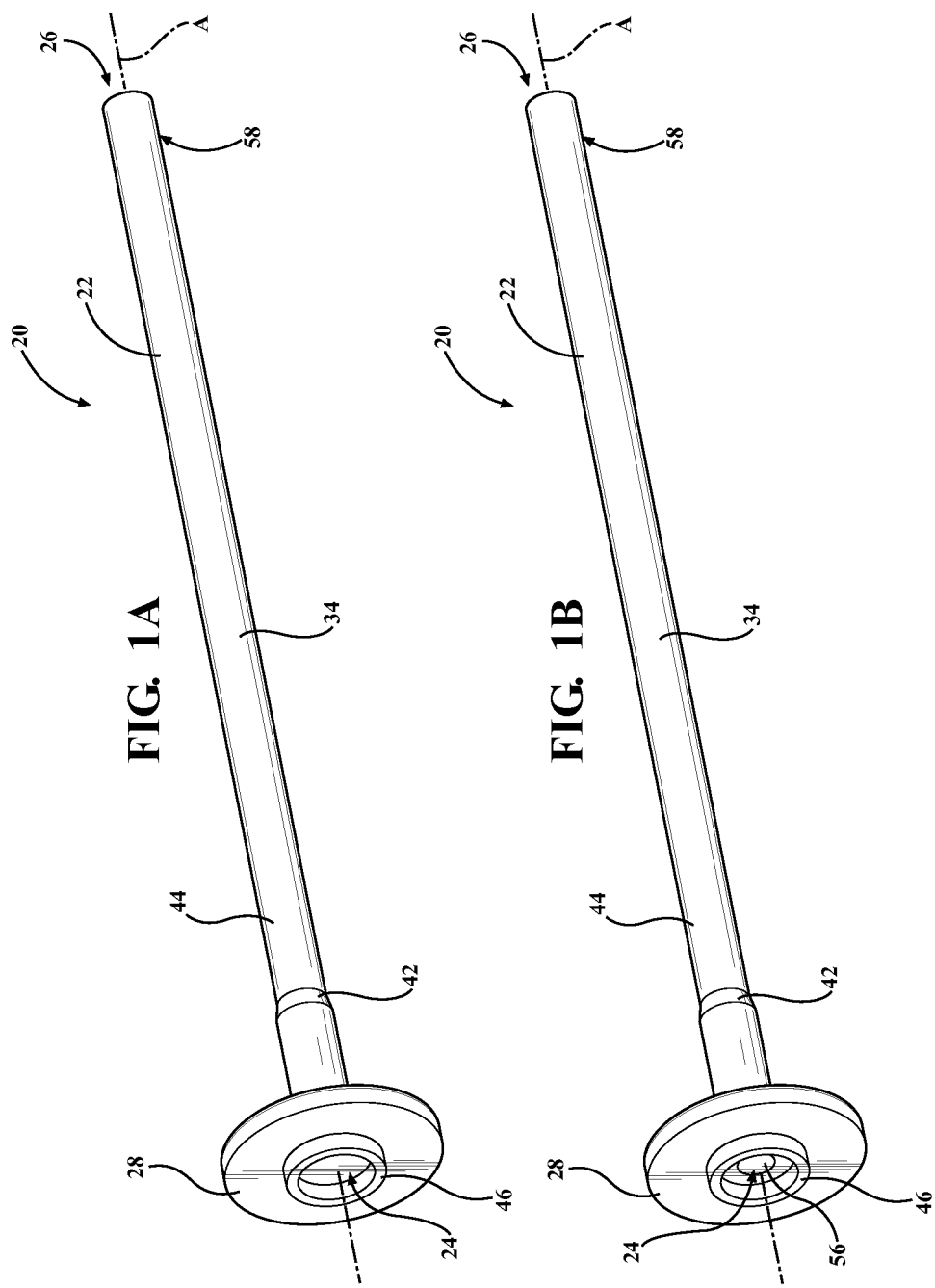

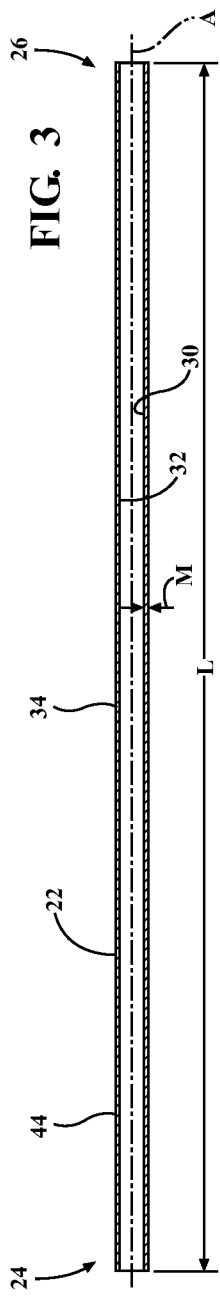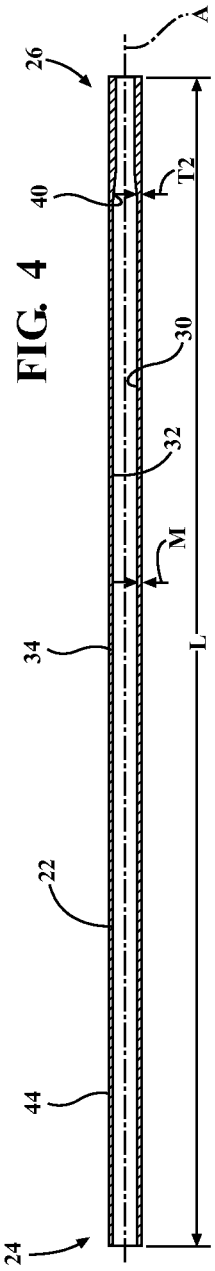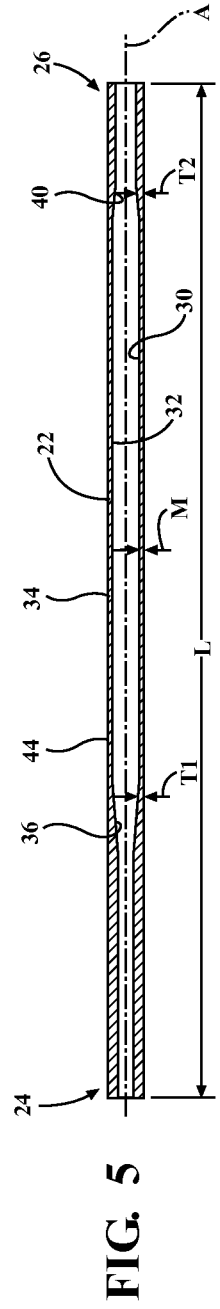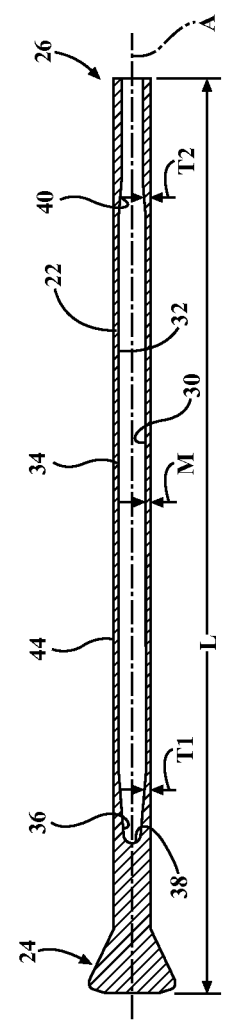

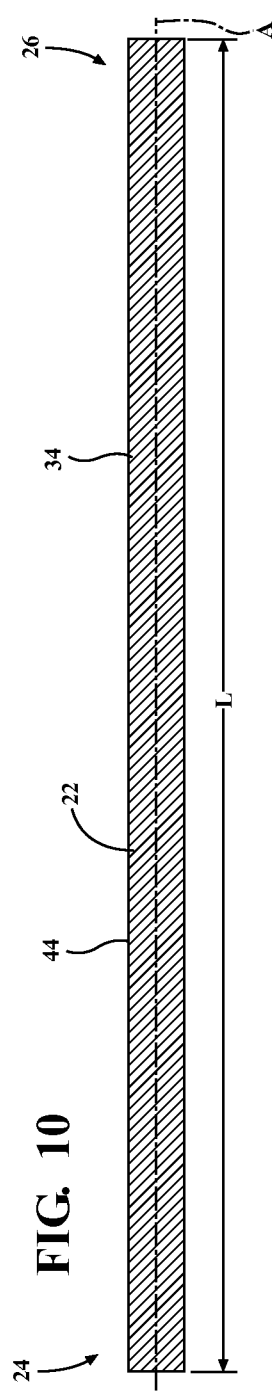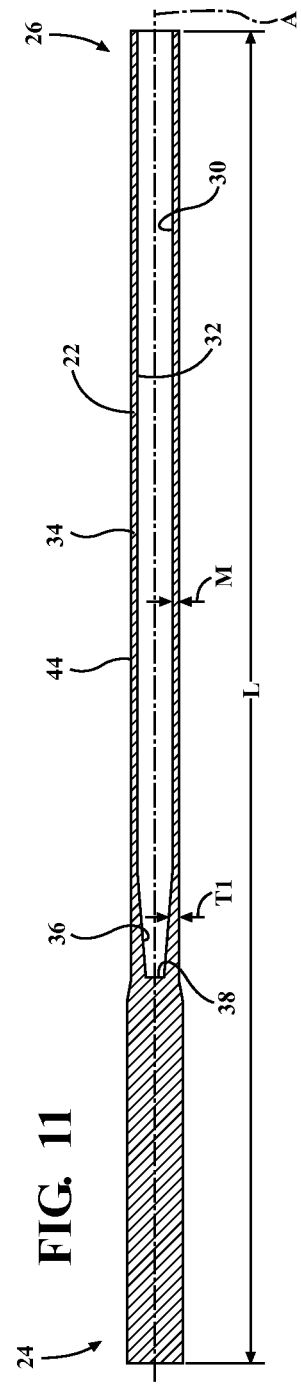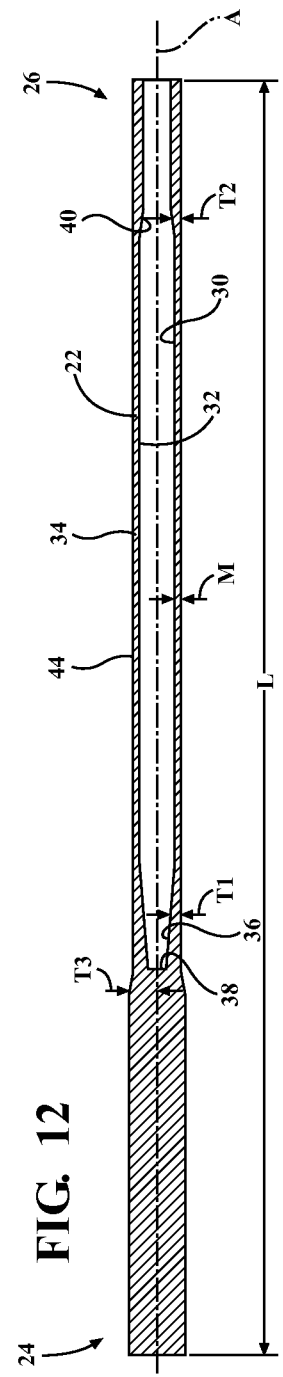

METHOD OF MANUFACTURING HOLLOW AXLE SHAFT FOR A VEHICLE

BACKGROUND OF THE INVENTION

1. Field of the Invention

The subject invention relates to a hollow axle shaft for transmitting rotational motion from a prime mover to a wheel of a vehicle and a method of manufacturing the hollow axle shaft.

2. Description of Related Art

Vehicles typically include a prime mover, such as an engine or an electric motor, for driving at least one wheel. The vehicle typically includes an axle shaft which couples the engine with the at least one wheel for transmitting rotational motion from the engine to the at least one wheel. One example of the axle shaft has a tube and a flange with the wheel mounted to the flange. The tube extends between a pair of ends with the flange positioned at one of the pair of ends. The tube and the flange are independently produced with the flange joined with one of the pair of ends by welding.

Joining the flange with one of the ends by welding adds additional time and cost to the process of manufacturing the axle shaft. Furthermore, joining the flange with one of the ends by welding reduces the strength of a region of the flange and/or the tube adjacent to the abutment of the flange and the tube that is joined by welding. Therefore, there remains an opportunity to develop an improved axle shaft with a flange.

SUMMARY OF THE INVENTION AND ADVANTAGES

A hollow axle shaft transmits rotational motion from a prime mover to a wheel of a vehicle. The hollow axle shaft comprises an elongated member extending along an axis between a first end and a second end. The hollow axle shaft further comprises a flange at the first end and extending radially away from the axis for receiving the wheel. The flange is integral with the elongated member. A method of manufacturing the hollow axle shaft is also discussed.

Accordingly, the integral relationship of the elongated member and the flange reduces the number of steps required to manufacture the hollow axle shaft. Specifically, the formation of the flange from the first end of the elongated member eliminates a step of joining the elongated member with the flange, typically by welding. Eliminating the step of welding reduces energy and/or material required to complete the joining process, which reduces the cost to manufacture the hollow axle shaft. Furthermore, reducing the number of steps required to manufacture the hollow axle shaft reduces the amount of time needed to manufacture the hollow axle shaft, which increases the rate at which the hollow axle shaft may be manufactured.

BRIEF DESCRIPTION OF THE DRAWINGS

Advantages of the subject invention will be readily appreciated as the same becomes better understood by reference to the following detailed description when considered in connection with the accompanying drawings.

FIG. 1A is a perspective view of a hollow axle shaft having an elongated member and a flange.

FIG. 1B is a perspective view of the hollow axle shaft including a cap.

FIG. 3 is a cross-sectional view of the elongated member defining a bore extending along an axis between first and second ends.

FIG. 4 is a cross-sectional view of the elongated member with a diameter of the bore narrowed at the second end.

FIG. 5 is a cross-sectional view of the elongated member with the diameter of the bore narrowed at each of the first and second ends.

FIG. 6 is a cross-sectional view of the elongated member with the diameter of the bore narrowed at the second end and the bore truncated between the middle portion and the first end such that the first end is solid.

FIG. 10 is a cross-sectional view of the elongated member further defined as a solid bar stock.

FIG. 11 is a cross-sectional view of the elongated member defining the bore partially through the elongated member along the axis.

FIG. 12 is a cross-sectional view of the elongated member defining the bore partially through the elongated member along the axis with the diameter of the bore narrowed at the second end.

DETAILED DESCRIPTION OF THE INVENTION

Figure 2A:
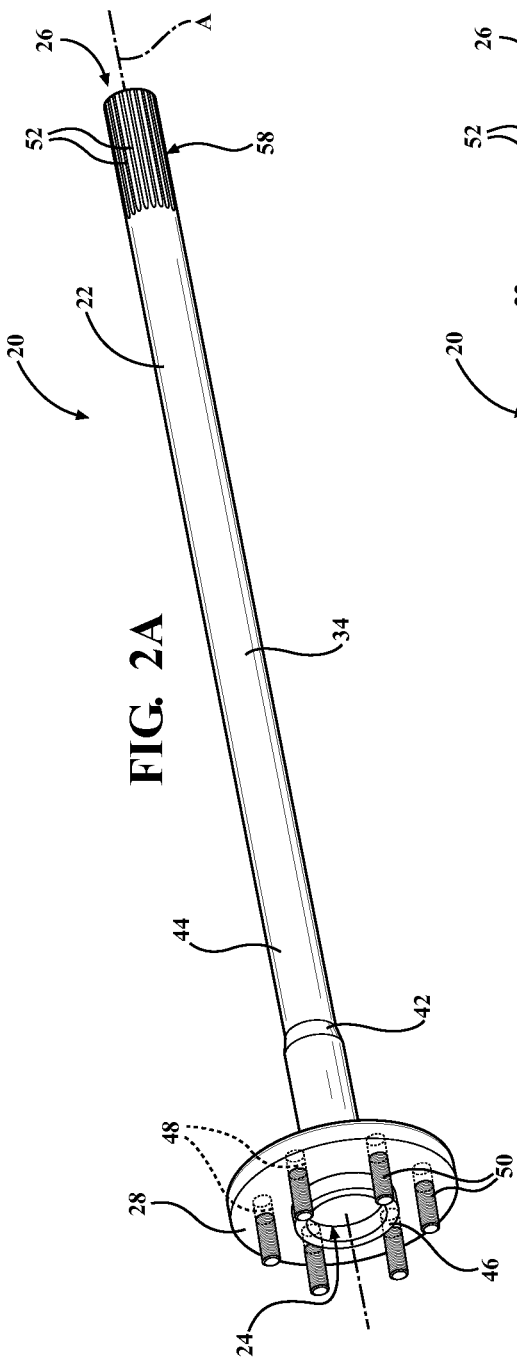
FIG. 2A is a perspective view of the hollow axle shaft including a plurality of studs and a plurality of splines.

Referring to the Figures, wherein like numerals indicate like or corresponding parts throughout the several views, a hollow axle shaft 20 for transmitting rotational motion from a prime mover to a wheel of a vehicle, is generally shown in FIGS. 1A and 1B. The vehicle is typically a truck, such as a pickup truck or a sport-utility vehicle, or a passenger car; however, it is to be appreciated that the vehicle may be any vehicle, including all-terrain vehicles, trains, etc.

The prime mover is typically an internal combustion engine or electric motor. However, it is to be appreciated that the prime mover may be any device for imparting rotational motion of the wheel. It is also to be appreciated that the prime mover may be any number of prime movers. The vehicle may include a plurality of wheels. Rotational motion from the prime mover is transmitted to at least one of the plurality of wheels; however, rotational motion from the prime mover may be transmitted to more than one of the plurality of wheels. As such, the vehicle may include a plurality of hollow axle shafts 20 with each hollow axle shaft 20 transmitting rotational motion from the prime mover independently to each of the more than one of the plurality of wheels. It is to be appreciated that more than one of the plurality of hollow axle shafts 20 may transmit rotational motion from the prime mover to one of the plurality of wheels. The plurality of wheels are generally discussed below for illustrative purposes below. Hereinafter, the term "wheel" is used for descriptive purposes only and it is to be understood the term "wheel" is applicable to a single wheel and any number of wheels including the plurality of wheels. Likewise, the plurality of hollow axle shafts 20 are generally discussed below for illustrative purposes. Hereinafter, the term "hollow axle shaft 20" is used for descriptive purposes only and it is to be understood the term "hollow axle shaft 20" is applicable to a single hollow axle shaft 20 and any number of hollow axle shafts 20 including the plurality of hollow axle shafts 20.

The hollow axle shaft 20 is typically disposed between the prime mover and the wheel and is a component of what is commonly referred to as a driveline. The driveline is typically a plurality of components which may include (but is not limited to) any combination and any quantity of the following: a transmission, a differential, a power take-off unit, and a transfer case. Typically, the hollow axle shaft 20 is located between and couples the differential with the wheel. However, it is to be appreciated that the hollow axle shaft 20 may be located anywhere within the driveline and may be in communication with any of the aforementioned components of the driveline, including components not explicitly stated herein. When located between and coupling the differential with the wheel, the hollow axle shaft 20 is typically a component of a semi-float axle. However, it is to be appreciated that the hollow axles may be a component in a full-float axle, an independent suspension axle configuration, or any other suitable axle configuration.

As shown in FIGS. 1A and 1B, the hollow axle shaft 20 comprises an elongated member 22 extending along an axis A between a first end 24 and a second end 26. The hollow axle shaft 20 further comprises a flange 28 at the first end 24 extending radially away from the axis A for receiving the wheel. The flange 28 is integral with the elongated member 22.

Figure 7:
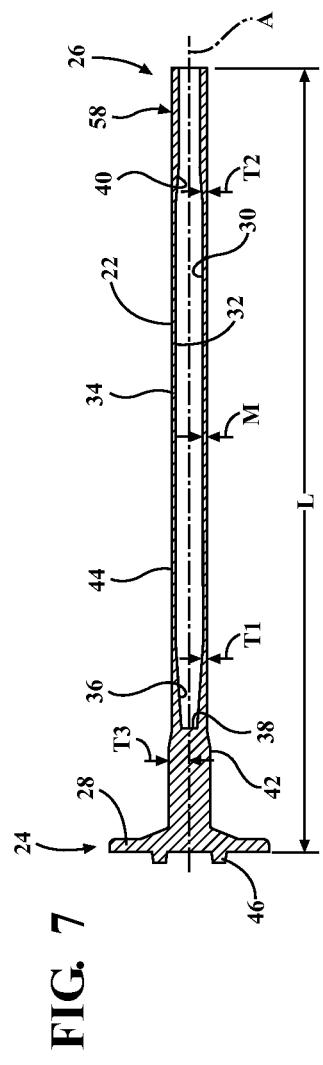
FIG. 7 is a cross-sectional view of the hollow axle shaft with the diameter of the bore narrowed at the second end, with the bore truncated between the middle portion and the first end, and with the flange at the first end.
Figure 9:
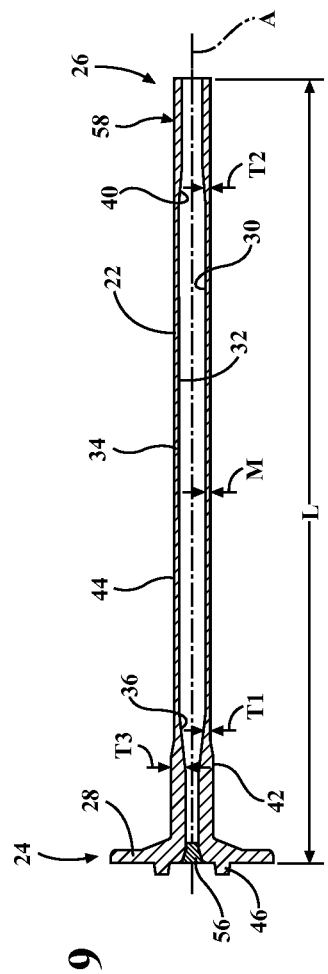
FIG. 9 is a cross-sectional view of the hollow axle shaft the diameter of the bore narrowed at each of the first and second ends, with the flange at the first end, and with the cap at the first end.

As shown in FIGS. 7 and 9, the elongated member 22 defines a bore 30 extending along the axis A between the first and second ends 24, 26. Said differently, the elongated member 22 includes an interior 32 and an exterior 44 with the interior 32 defining the bore 30 longitudinally along the elongated member 22. The elongated member 22 may define the bore 30 along the elongated member 22 between the first and second ends 24, 26, as shown in FIG. 9. Alternatively, the elongated member 22 may define the bore 30 along a portion of the elongated member 22 between the first and second ends 24, 26, as shown in FIG. 7. More specifically, the elongated member 22 may have a middle portion 34 between the first and second ends 24, 26, with the elongated member 22 defining the bore 30 from the second end 26 and along the middle portion 34. Said differently, the elongated member 22 does not define the bore 30 at the first end 24 such that the first end 24 is solid. It is to be appreciated that the elongated member 22 may define the bore 30 from the second end 26 and along the middle portion 34 such that the second end 26 is solid. Furthermore, the middle portion 34 of the elongated member 22 may define the bore 30 such that the first and second ends 24, 26 are solid.

The elongated member 22 typically comprises a material. The material is typically metallic, such as a steel alloy; however, it is to be appreciated that the material may be any metal or metal alloy, including, but not limited to, titanium, aluminum, magnesium, and combinations thereof. Furthermore, it is to be appreciated that the material may comprise any material suitable for transmitting rotational motion, including, but not limited to, plastics, composites, and ceramics.

The elongated member 22 has an inner radius and an outer radius. The inner radius is measured between the axis A and the interior 32 and may be measured anywhere along the interior 32. Said differently, the bore 30 has a diameter which is equal to twice the inner radius. The outer radius is measured between the axis A and the exterior 44 and may be measured anywhere along the exterior 44. Furthermore, the material of the elongated member 22 has a cross-sectional thickness. The cross-sectional thickness of the material of the elongated member 22 is defined between the inner and outer radii. Generally, the inner radius and the outer radius are uniform along the axis A such that the cross-sectional thickness of the material is generally uniform along the axis A. However, the inner and outer radii may vary along the axis A which may alter the cross-sectional thickness of the material as described below.

As shown in FIGS. 7 and 9, the elongated member 22 may also have a first surface 36 between the middle portion 34 and the first end 24 with the first surface 36 partially defining the bore 30. The elongated member 22 defines the first surface 36 along the interior 32 of the elongated member 22. The first surface 36 is tapered such that the elongated member 22 thickens from the middle portion 34 to the first end 24. Said differently, the first surface 36 is tapered toward the axis A relative to the exterior 44 while the exterior 44 remains substantially constant such that the cross-sectional thickness of the elongated member 22 increases along the axis A from the middle portion 34 to the first end 24. The inner radius of the elongated member 22 decreases along the first surface 36. More specifically, the inner radius of the elongated member 22 is greater at the middle portion 34 than at the first surface 36. As such, the cross-sectional thickness of the elongated member 22 may be further defined as a middle cross-sectional thickness M at the middle portion and a first cross-sectional thickness T1 at the first surface 36. The first cross-sectional thickness T1 is greater than the middle cross-sectional thickness M.

When the elongated member 22 defines the bore 30 from the second end 26 and along the middle portion 34 as shown in FIG. 7, the first surface 36 partially defines a bottom 38 of the bore 30.

As shown in FIGS. 7 and 9, the elongated member 22 may also have a second surface 40 between the middle portion 34 and the second end 26 with the second surface 40 partially defining the bore 30. The elongated member 22 defines the second surface 40 along the interior 32 of the elongated member 22. The second surface 40 is tapered such that the elongated member 22 thickens from the middle portion 34 to the second end 26. Said differently, the second surface 40 is tapered toward the axis A relative to the exterior 44 while the exterior 44 remains substantially constant such that the cross-sectional thickness of the elongated member 22 increases along the axis A from the middle portion 34 to the second end 26. The inner radius of the elongated member 22 decreases along the second surface 40. More specifically, the inner radius of the elongated member 22 is greater at the middle portion 34 than at the second surface 40. As such, the cross-sectional thickness of the elongated member 22 may be further defined as a second cross-sectional thickness T2 at the second surface 26. The second cross-sectional thickness T2 is greater than the middle cross-sectional thickness M.

The elongated member 22 may also define a transition surface 42 along the exterior 44 of the elongated member 22 between the middle portion 34 and the first end 24. The transition surface 42 is tapered such that the elongated member 22 thickens from the middle portion 34 to the first end 24. Said differently, the transition surface 42 is tapered away from the axis A relative to the interior 32 whiles the interior 32 remains substantially constant such that the cross-sectional thickness of the elongated member 22 increases along the axis A from the middle portion 34 to the first end 24. The outer radius of the elongated member 22 increases along the transition surface 42. More specifically, the outer radius of the elongated member 22 is greater at the transition surface 42 than at the middle portion 34. As such, the cross-sectional thickness of the elongated member 22 may be further defined as a third cross-sectional thickness T3 at the transition surface 42. The third cross-sectional thickness T3 is greater than the middle cross-sectional thickness M.

As shown in FIGS. 1A and 1B, the flange 28 extends radially away from the axis A. Typically, the radial extension of the flange 28 results in the flange 28 having a circular configuration about the axis A. However, it is to be appreciated that the flange 28 may extend in any particular shape about the axis A for receiving the wheel.

The flange 28 may have a pilot ring 46 centered about the axis A and extending away from the elongated member 22. The pilot ring 46 engages and centers the wheel about the axis A. Furthermore, the pilot ring 46 supports the wheel transverse to the axis A such that loads acting on the wheel transverse to the axis A are transferred to the pilot ring 46 preventing movement of the wheel transverse to the axis A relative to the hollow axle shaft 20.

Figure 2B:
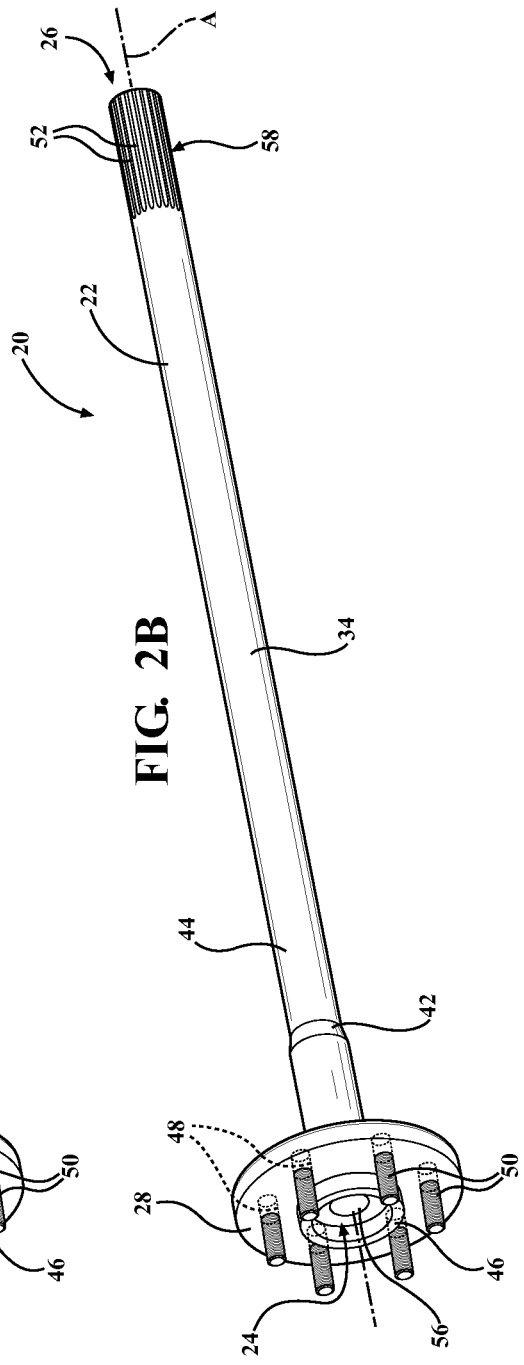
FIG. 2B is a perspective view of the hollow axle shaft including the plurality of studs, the plurality of splines, and the cap.

As shown in FIGS. 2A and 2B, the flange 28 may define a plurality of holes positioned radially about the axis A and spaced from one another. The hollow axle shaft 20 may include a plurality of studs 50 with the studs 50 individually and partially disposed in each of the plurality of holes. Each of the plurality of studs 50 extends from a respective hole away from the elongated member 22. Each of the plurality of studs 50 is coupled to the flange 28 by, for example, welding or a press-fit engagement with the flange 28. It is to be appreciated that each of the plurality of studs 50 may be coupled to the flange 28 in any suitable manner. Typically, each of the plurality of studs 50 is threaded, with each of the plurality of studs 50 extending through the wheel and with a plurality of lug nuts in threaded engagement with the studs 50 to compress the wheel between the flange 28 and the plurality of lug nuts. Alternatively, the hollow axle shaft 20 may not include the plurality studs 50. Instead, the flange 28 may have a threaded surface within each of the plurality of holes. A plurality of lug bolts may extend through the wheel and engage the threaded surface of the flange 28 within each of the plurality of holes, with the wheel compressed between the flange 28 and the lug bolts.

The hollow axle shaft 20 may further comprise a plurality of splines 52 at the second end 26. The plurality of splines 52 extend radially away from the axis A for coupling the hollow axle shaft 20 to the prime mover. Each of the plurality of splines 52 is spaced from one another about the axis A and extend longitudinally relative to the axis A, with each of the plurality of splines 52 substantially parallel to one another and the axis A. The plurality of splines 52 may engage a side gear within the differential to couple the differential with the hollow axle shaft 20.

The elongated member 22 and the flange 28 may comprise a single, continuous material. Furthermore, the plurality of splines 52 may comprise the single, continuous material. The single, continuous material is the same as the material of the elongated member 22 described above. Because the elongated member 22, the flange 28, and the plurality of splines 52 may comprise the single, continuous material, the flange 28 and/or the plurality of splines 52 are not joined to the elongated member 22, such as by welding.

As described above and as shown in FIGS. 7 and 9, the first and transition surfaces 36, 42 are located where the material of the elongated member 22 thickens toward the first end 24 and the second surface 40 is located where the material of the elongated member 22 thickens toward the second end 26. The thickening of the material at the first and second ends 24, 26 of the elongated member 22 may be required during the manufacture of the hollow axle shaft 20 to form the flange 28 and the plurality of splines 52, respectively, as will be described in greater detail below.

The subject invention sets forth a method of manufacturing the hollow axle shaft 20. As described above, the hollow axle shaft 20 includes the elongated member 22 extending along the axis A between the first end 24 and the second end 26 and defines the bore 30 extending along the axis A between the first and second ends 24, 26. Furthermore, the hollow axle shaft 20 includes the flange 28 at the first end 24 extending radially away from the axis A for receiving the wheel. The method comprises the step of providing the elongated member 22 comprising the material and defining the bore 30 and the step of forming the flange 28 with the material at the first end 24.

At the step of providing the elongated member 22, the elongated member 22 typically has a tubular configuration, as shown in FIG. 3. Said differently, the elongated member 22 defines the bore 30 longitudinally along the entire elongated member 22. The elongated member 22 may be a seamless tube, which is generally produced by extrusion or rotary piercing. The elongated member 22 may be an electric resistance welded (ERW) tube which is formed by rolling a plate into a tubular configuration (such that opposing sides of the plate meet) and welding the opposing sides of the plate to each other. The elongated member 22 may also be a solid bar stock forged to define the bore 30 and the tubular configuration. It is to be appreciated that the elongated member 22 may be provided defining the bore 30 in any suitable configuration.

As an alternative to the step of providing the elongated member 22 comprising the material and defining the bore 30, the method may comprise the steps of providing the elongated member 22 comprising the material and forming the bore 30 extending partially through the elongated member 22 by removing a portion of the material along the axis A from the second end 26 toward the first end 24, as shown in FIGS. 11 and 12. Said differently, the elongated member 22 may be the solid bar stock and may have a length L, as shown in FIG. 10. The length L is measured between the first and second ends 24, 26. The step of forming the bore 30 extending partially through the elongated member 22 is further defined forming the bore 30 extending partially through the solid bar stock. Furthermore, the step of forming the bore 30 extending partially through the elongated member 22 is further defined as forming the bore 30 extending through about three-quarters of the length L of the elongated member 22 from the second end 26 toward the first end 24, as shown in FIGS. 11 and 12. Said differently, the elongated member 22 does not define the bore 30 entirely along the length L of the elongated member 22, such that the first end 24 is solid. The step of forming the bore 30 may be performed by drilling partially through the elongated member 22. It is to be appreciated the step of forming the bore 30 may be performed by any suitable material removal process, such as piercing.

Typically, the step of forming the bore 30 occurs prior to the step of forming the flange 28. However, it is to be appreciated that the step of forming the bore 30 may occur after to the step of forming the flange 28.

The method may further include the step of rotary-cutting the exterior 44 of the elongated member 22 about and along the axis A to remove a portion of the material from the exterior 44 of the elongated member 22. The step of rotary-cutting is typically referred to as turning which is typically performed on a lathe. Rotary-cutting the exterior 44 of the elongated member 22 cylindrically configures the exterior 44 such that the outer radius is equal about the axis A. It is to be appreciated that rotary-cutting may be performed by any suitable material removal process.

Typically, the step of rotary-cutting the exterior 44 of the elongated member 22 occurs prior to the step of forming the flange 28. It is to be appreciated that the step of rotary-cutting the exterior 44 of the elongated member 22 may occur after the step of forming the flange 28.

The step of forming the flange 28 with the material at the first end 24 typically involves deforming the material at the first end 24 of the elongated member 22, and is shown in FIGS. 7 and 9. The step of forming the flange 28 may be performed by forging the first end 24. Said differently, the flange 28 is formed from the material at the first end 24 by applying a localized compressive force to the first end 24. It is to be appreciated that the step of forming the flange 28 may be performed by any suitable method, including, but not limited to, rolling, spinning, upsetting, and rotary swaging. Typically, the application of the localized compressive force is along the axis A which moves the material at the first end 24 radially toward and/or away from the axis A. As such, the length L of the elongated member 22 prior to the step of forging the first end 24 is typically longer than the length L of the elongated member 22 following the step of forging the first end 24 because the material of the first end 24 has been radially displaced toward and/or away from the axis A.

The step of forging the flange 28 may be performed by horizontally forging the first end 24. Horizontal forging is typically performed by at least one die which moves horizontally to apply the localized compressive force. Horizontal forging may be performed by (but is not limited to performance by) a horizontal hydraulic press, a horizontal mechanical press, a horizontal screw press, and a horizontal hammer press.

The step of forging the flange 28 may be performed by vertically forging the first end 24. Vertical forging is typically performed by at least one die which moves vertically to apply the localized compressive force. Vertical forging may be performed by (but is not limited to performance by) a vertical hydraulic press, a vertical mechanical press, a vertical screw press, and a vertical hammer press.

It is to be appreciated that the step of forming the flange 28 may comprise multiple steps. As a non-limiting example, when the step of forming the flange 28 is performed by forging, the localized compressive force may be applied to the first end 24 more than once. As another non-limiting example, the step of forming the flange 28 may involve both forging as well as another forming process. As yet another non-limiting example, the step of forging may involve both vertical forging and horizontal forging.

Figure 8:
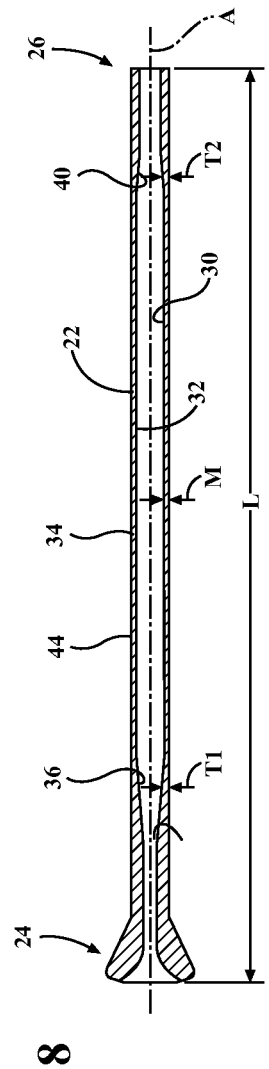
FIG. 8 is a cross-sectional view of the elongated member with the diameter of the bore narrowed at each of the first and second ends, and with the elongated member gathered at the first end and extending radially away from the axis.

When the method comprises the step of providing the elongated member 22 comprising the material and defining the bore 30, it may be advantageous to thicken the material of the elongated member 22 at the first end 24 to facilitate the forming of the flange 28. As such, the method may further comprise the step of gathering the material at the first end 24 to increase the cross-sectional thickness of the material at the first end 24 prior to the step of forming the flange 28 with the material at the first end 24, as shown in FIGS. 5, 6, and 8. The step of gathering the material typically involves moving the material of the elongated member 22 to increase the cross-sectional thickness of the material at the first end 24.

The step of gathering the material at the first end 24 may be further defined as upsetting the first end 24 to thicken the material of the elongated member 22 about the axis A at the first end 24, as shown in FIGS. 6 and 8. The step of upsetting the first end 24 is typically defined as applying a load along the axis A at the first end 24. The application of the load along the axis A moves the material at the first end 24 radially away from the axis A. As such, the length L of the elongated member 22 prior to the step of upsetting the first end 24 is typically longer than the length L of the elongated member 22 following the step of upsetting the first end 24 because the material of the first end 24 has been radially displaced away from the axis A. It is to be appreciated that the step of upsetting the first end 24 may be further defined as applying the load along the axis A and another load transverse to the axis A.

The step of upsetting the first end 24 may be further defined as upsetting the first end 24 to move the material toward the axis A and fill the bore 30 at the first end 24, as shown in FIG. 6. Said differently, the step of upsetting the first end 24 moves the material of the elongated member 22, radially configured about the axis A, inward toward the axis A such that the material about the axis A converges to abut at the axis A. Alternatively, the step of upsetting the first end 24 may move the material toward, but not entirely to, the axis A, as shown in FIG. 8. As such, the bore 30 is not filled at the first end 24. The inner radius of the elongated member 22 is smaller at the first end 24 than the middle portion 34.

Returning to FIGS. 6 and 8, the step of upsetting the first end 24 may be further defined as electrically upsetting the first end 24 to increase the cross-sectional thickness of the material at the first end 24. During the step of electrical upsetting, a high current is passed into the first end 24 of the elongated member 22. Electrical resistance within the material of the elongated member 22 at the first end 24 causes the first end 24 to heat up. The load is then applied along the axis A at the first end 24. The step of electrically upsetting the first end 24 is typically performed by abutting the first end 24 of the elongated member 22 against a plate with the plate electrified by the high current. The elongated member 22 may move along the axis A toward the plate to apply the load to the first end 24. Alternatively, the plate may move along the axis A toward the elongated member 22 to apply the load to the first end 24. The application of the load along the axis A moves the material at the first end 24 radially away from the axis A. As such, the length L of the elongated member 22 prior to the step of electrically upsetting the first end 24 is typically longer than the length L of the elongated member 22 following the step of electrically upsetting the first end 24 because the material of the first end 24 has been radially displaced away from the axis A. It is to be appreciated that the step of electrically upsetting the first end 24 may be further defined as applying the load along the axis A and the another load transverse to the axis A.

The step of electrically upsetting the first end 24 may be further defined as electrically upsetting the first end 24 to move the material toward the axis A and fill the bore 30 at the first end 24, as shown in FIG. 6. Said differently, the step of electrically upsetting the first end 24 moves the material of the elongated member 22, radially configured about the axis A, inward toward the axis A such that the material about the axis A converges to abut at the axis A. Alternatively, the step of electrically upsetting the first end 24 may move the material toward, but not entirely to, the axis A, as shown in FIG. 8. As such, the bore 30 is not filled at the first end 24. The inner radius of the elongated member 22 is smaller at the first end 24 than the middle portion 34.

The step of gathering the material at the first end 24 may be performed by radial forging, as shown in FIG. 5. The step of radial forging is typically performed by inserting a mandrel into the bore 30 at the first end 24 of the elongated member 22; however, it is to be appreciated that the step of radial forging may be performed without the use of the mandrel. The step of radial forging is typically performed by a plurality of dies encircling the first end 24 of the elongated member 22 with the plurality of dies striking the exterior 44 to deform the material at the first end 24 toward the axis A as the elongated member 22 rotates about the axis A. It is to be appreciated that the plurality of dies may rotate about the axis A and strike the exterior 44 to deform the material at the first end 24 toward the axis A while the elongated member 22 stays stationary. The step of radial forging may be further performed by a wall abutting the first end 24 of the elongated member 22. The elongated member 22 may move along the axis A toward the wall to apply a load to the first end 24 along the axis A to radially displace and further thicken the material away from the axis A at the first end 24. Alternatively, the wall may move along the axis A toward the elongated member 22 to apply the load to the first end 24. As such, the length L of the elongated member 22 prior to the step of radial forging the first end 24 may be longer than the length L of the elongated member 22 following the step of radial forging the first end 24 because the material of the first end 24 has been radially displaced away from the axis A.

Typically, the step of radial forging the first end 24 may move the material toward, but not entirely to, the axis A. As such, the bore 30 is not filled at the first end 24. The inner radius of the elongated member 22 is smaller at the first end 24 than the middle portion 34. It is to be appreciated that the step of radial forging the first end 24 may move the material toward the axis A and fill the bore 30 at the first end 24. Said differently, the step of radial forging the first end 24 moves the material of the elongated member 22, radially configured about the axis A, inward toward the axis A such that the material about the axis A converges to abut at the axis A.

The step of radial forging the first end 24 may be performed at a temperature substantially equal to a temperature of the ambient air. When the radial forging is performed at the temperature substantially equal to the temperature of the ambient air, the step of radial forging is typically referred to as cold swaging.

The method may further comprise the step of heating the first end 24 of the elongated member 22 from about 1,200 to 2,300° F. prior to the step of radial forging the first end 24. When the first end 24 of the elongated member 22 is heated from about 1,200 to 2,300° F. prior to the step of radial forging the first end 24, the step of radial forging is typically referred to as hot rotary forging. Preferably, the step of heating the first end 24 of the elongated member 22 from about 1,200 to about 2,300° F. may be further defined as heating the first end 24 of the elongated member 22 from about 1,800 to about 2,300° F.

The step of upsetting the first end 24 described above may be the sole method of performing the step of gathering the material at the first end 24. Similarly, the step of radial forging the first end 24 may be the sole method of performing the step of gathering the material at the first end 24. Alternatively, the step of gathering the material at the first end 24 may be performed by radial forging, as shown in FIG. 5, and then upsetting the first end 24 to thicken the material of the elongated member 22 about the axis A at the first end 24, as shown in FIGS. 6 and 8.

When the step of gathering the material at the first end 24 is performed by radial forging and then upsetting the first end 24, the step of radial forging is equivalent to the step of radial forging the first end 24 as the sole method of performing the step of gathering the material at the first end 24, as described above. Furthermore, when the step of gathering the material at the first end 24 is performed by radial forging and then upsetting the first end 24, the step of upsetting the first end 24 may be further defined as upsetting the first end 24 to move the material toward the axis A and fill the bore 30 at the first end 24, as shown in FIG. 6. The step of upsetting the first end 24 to move the material toward the axis A and fill the bore 30 at the first end 24, used in the context of following the step of radial forging, is equivalent to the step of upsetting the first end 24 to move the material toward the axis A and fill the bore 30 at the first end 24, used in the context of the sole method of performing the step of gathering the material at the first end 24, and has been described in greater detail above.

It is to be appreciated that the step of upsetting the first end 24 may move the material toward, but not entirely to, the axis A, as shown in FIG. 8. As such, the bore 30 may not be filled at the first end 24.

Returning to FIGS. 6 and 8, when the step of gathering the material at the first end 24 is performed by radial forging and then upsetting the first end 24, the step of upsetting the first end 24 may be further defined as electrically upsetting the first end 24 to increase the cross-sectional thickness of the material at the first end 24. The step of electrically upsetting the first end 24 to increase the cross-sectional thickness of the material at the first end 24, used in the context of following the step of radial forging, is equivalent to the step of electrically upsetting the first end 24 to increase the cross-sectional thickness of the material at the first end 24, used in the context of the sole method of performing the step of gathering the material at the first end 24, and has been described in greater detail above.

When the step of gathering the material at the first end 24 is performed by radial forging and then upsetting the first end 24, the step of electrically upsetting the first end 24 may be further defined as electrically upsetting the first end 24 to move the material toward the axis A and fill the bore 30 at the first end 24, as shown in FIG. 6. The step of electrically upsetting the first end 24 to move the material toward the axis A and fill the bore 30 at the first end 24, used in the context of following the step of radial forging, is equivalent to the step of electrically upsetting the first end 24 to move the material toward the axis A and fill the bore 30 at the first end 24, used in the context of the sole method of performing the step of gathering the material at the first end 24, and has been described in greater detail above.

The step of electrically upsetting the first end 24 may move the material toward, but not entirely to, the axis A, as shown in FIG. 8. As such, the bore 30 may not be filled at the first end 24.

As described above, the step of gathering the material at the first end 24 is performed by radial forging, which precedes the step of upsetting the first end 24. It is to be appreciated that the step of gathering the material at the first end 24 may be performed by upsetting the first end 24, which precedes the step of radial forging the first end 24.

The step of gathering the material of the elongated member 22 at the first end 24 increases the cross-sectional thickness of the material at the first end 24. By thickening the material at the first end 24, the first and transition surfaces 36, 42 are formed with the first and third cross-sectional thicknesses T1, T3 of the material greater than the middle cross-sectional thickness M of the material.

The hollow axle shaft 20 may further include a cap 56 disposed in the bore 30 at the first end 24. The method may further comprise the step of inserting the cap 56 into the bore 30 at the first end 24, as shown in FIG. 9. The cap 56 typically has a cylindrical configuration and is press fit into the bore 30 of the elongated member 22 at the first end 24 to close the bore 30 of the elongated member 22 at the first end 24.

The step of gathering the material at the first end 24 to thicken the material of the elongated member 22 about the axis A at the first end 24, as described above, may occur prior to the step of inserting the cap 56 in the bore 30 at the first end 24. Typically, the cap 56 is inserted when the step of gathering the material at the first end 24 does not fill the bore 30 at the first end 24. Furthermore, the step of inserting the cap 56 in the bore 30 may occur after the step of forming the flange 28. It is to be appreciated that the step of inserting the cap 56 in the bore 30 may occur prior to the step of gathering the material at the first end 24 and the step of forming the flange 28.

The hollow axle shaft 20 may include a spline region 58 at the second end 26. The spline region 58 is a portion of the elongated member 22 at the second end 26 from which the plurality of splines 52 may be formed. The method may further comprise the step of forming the spline region 58 with the material of the elongated member 22 at the second end 26, as shown in FIGS. 7 and 9.

The step of forming the spline region 58 may be performed by forging the second end 26. Said differently, the spline region 58 is formed from the material at the second end 26 by applying a localized compressive force to the second end 26. It is to be appreciated that the step of forming the spline region 58 may be performed by any suitable method, including, but not limited to, rolling, spinning, upsetting, and rotary swaging. Typically, the application of the localized compressive force is along the axis A which moves the material at the second end 26 radially toward and/or away from the axis A. As such, the length L of the elongated member 22 prior to the step of forging the second end 26 is typically longer than the length L of the elongated member 22 following the step of forging the second end 26 because the material of the second end 26 has been radially displaced toward and/or away from the axis A.

The step of forging the spline region 58 may be performed by horizontally forging the second end 26. As described above regarding the step of forging the flange 28, horizontal forging is typically performed by at least one die which moves horizontally to apply the localized compressive force. Horizontal forging may be performed by (but is not limited to performance by) a horizontal hydraulic press, a horizontal mechanical press, a horizontal screw press, and a horizontal hammer press.

The step of forging the spline region 58 may be performed by vertically forging the second end 26. As described above regarding the step of forging the flange 28, vertical forging is typically performed by at least one die which moves vertically to apply the localized compressive force. Vertical forging may be performed by (but is not limited to performance by) a vertical hydraulic press, a vertical mechanical press, a vertical screw press, and a vertical hammer press.

It is to be appreciated that the step of forming the spline region 58 may comprise multiple steps. As a non-limiting example, when the step of forming the spline region 58 is performed by forging, the localized compressive force may be applied to the second end 26 more than once. As another non-limiting example, the step of forming the spline region 58 may involve both forging as well as another forming process. As yet another non-limiting example, the step of forging may involve both vertical forging and horizontal forging.

The hollow axle shaft 20 may include the plurality of splines 52 at the second end 26 with the splines 52 extending radially away from the axis A for coupling the hollow axle shaft 20 to the prime mover, as shown in FIGS. 2A and 2B. The method may further comprise the step of forming the plurality of splines 52 with the spline region 58 at the second end 26. Typically, the step of forming the plurality of splines 52 is performed by rolling the spline region 58. It is to be appreciated that the step of forming the plurality of splines 52 may be performed by any suitable process, including, but not limited to, swaging, rotary forging, and rotary swaging.

As described above, the hollow axle shaft 20 may include the plurality of splines 52. To facilitate the forming of the plurality of splines 52, it may be advantageous to thicken the material of the elongated member 22 at the second end 26. As such, the method may further comprise the step of gathering the material at the second end 26 to increase the cross-sectional thickness of the material at the second end 26, as shown in FIGS. 4 and 12. The step of gathering the material typically involves moving the material of the elongated member 22 to increase the cross-sectional thickness of the material at the second end 26.

The step of gathering the material at the second end 26 may be performed by radial forging. Similar to the step of radial forging the first end 24 described above, the step of radial forging is typically performed by inserting a mandrel into the bore 30 at the second end 26 of the elongated member 22; however, it is to be appreciated that the step of radial forging may be performed without the use of the mandrel. The step of radial forging may be further performed by a plurality of dies encircling the second end 26 of the elongated member 22 with the plurality of dies striking the exterior 44 to deform the material at the second end 26 toward the axis A as the elongated member 22 rotates about the axis A. It is to be appreciated that the plurality of dies may rotate about the axis A and strike the exterior 44 to deform the material at the first end 24 toward the axis A while the elongated member 22 stays stationary. The step of radial forging may be further performed by a wall abutting the second end 26 of the elongated member 22. The elongated member 22 may move along the axis A toward the wall to apply a load to the second end 26 along the axis A to radially displace and further thicken the material away from the axis A at the second end 26. Alternatively, the wall may move along the axis A toward the elongated member 22 to apply the load to the second end 26. As such the length L of the elongated member 22 prior to the step of radial forging the second end 26 may be longer than the length L of the elongated member 22 following the step of radial forging the second end 26 because the material of the second end 26 has been radially displaced away from the axis A.

Typically, the step of radial forging the second end 26 may move the material toward, but not entirely to, the axis A. As such, the bore 30 is not filled at the second end 26. The inner radius of the elongated member 22 is smaller at the second end 26 than the middle portion 34. It is to be appreciated that the step of radial forging the second end 26 may move the material toward the axis A and fill the bore 30 at the second end 26. Said differently, the step of radial forging the second end 26 moves the material of the elongated member 22, radially configured about the axis A, inward toward the axis A such that the material about the axis A converges to abut at the axis A.

The step of radial forging the second end 26 may be performed at a temperature substantially equal to the temperature of the ambient air. The method may further comprise the step of heating the second end 26 of the elongated member 22 from about 1,200 to 2,300° F. prior to the step of radial forging the second end 26. Preferably, the step of heating the second end 26 of the elongated member 22 from about 1,200 to about 2,300° F. may be further defined as heating the second end 26 of the elongated member 22 from about 1,800 to about 2,300° F.

The steps of gathering the material of the elongated member 22 at the second end 26 increases the cross-sectional thickness of the material at the second end 26. By thickening the material at the second end 26, the second surface 40 is formed with the second cross-sectional thickness T2 of the material greater than the middle cross-sectional thickness of the material M.

The steps set forth in the above method may be performed in any desired order. Furthermore, each and every step described above is not necessary for the method. Said differently, desired steps from those described above may be selected and applied when forming the hollow axle shaft 20. As a non-limiting example, the method may comprise the steps of providing the elongated member 22 comprising the material and defining the bore 30 (as shown in FIG. 3), radial forging the second end 26 to thicken the material of the elongated member 22 about the axis A at the second end 26 (as shown in FIG. 4), radial forging the first end 24 to thicken the material of the elongated member 22 about the axis A at the first end 24 (as shown in FIG. 5), electrically upsetting the first end 24 to move the material toward the axis A and fill the bore 30 at the first end 24 (as shown in FIG. 6), and forging the first end 24 to form the flange 28 (as shown in FIG. 7).

As another non-limiting example, the method may comprise the steps of providing the elongated member 22 comprising the material and defining the bore 30 (as shown in FIG. 3), radial forging the second end 26 to thicken the material of the elongated member 22 about the axis A at the second end 26 (as shown in FIG. 4), radial forging the first end 24 to thicken the material of the elongated member 22 about the axis A at the first end 24 (as shown in FIG. 5), electrically upsetting the first end 24 to thicken the material of the elongated member 22 about the axis A at the first end 24 (as shown in FIG. 8), and forging the first end 24 to form the flange 28 (as shown in FIG. 9). The method may further comprise the step of inserting the cap 56 into the bore 30 at the first end 24, as shown in FIG. 9.

The subject invention sets forth that the hollow axle shaft 20 is formed by a process. It is to be appreciated the process for forming the hollow axle shaft 20 may include any of the structure set forth above with reference to the hollow axle shaft 20 and any of the steps set forth in the description of the method above. For example, the process comprises the step of providing the elongated member 22 comprising the material and defining the bore 30 and the step of forming the flange 28 with the material at the first end 24.

At the step of providing the elongated member 22, the elongated member 22 typically has the tubular configuration, as shown in FIG. 3. Said differently, the elongated member 22 defines the bore 30 longitudinally along the entire elongated member 22. The elongated member 22 may be the seamless tube, which is generally produced by extrusion or rotary piercing. The elongated member 22 may be the electric resistance welded (ERW) tube which is formed by rolling the plate into the tubular configuration (such that opposing sides of the plate meet) and welding the opposing sides of the plate to each other. The elongated member 22 may also be the solid bar stock forged to define the bore 30 and the tubular configuration. It is to be appreciated that the elongated member 22 may be provided defining the bore 30 in any suitable configuration.

As an alternative to the step of providing the elongated member 22 comprising the material and defining the bore 30, the process may comprise the steps of providing the elongated member 22 comprising the material and forming the bore 30 extending partially through the elongated member 22 by removing the portion of the material along the axis A from the second end 26 toward the first end 24, as shown in FIGS. 11 and 12. Said differently, the elongated member 22 may be the solid bar stock and may have the length L, as shown in FIG. 10. The length L is measured between the first and second ends 24, 26. The step of forming the bore 30 extending partially through the elongated member 22 is further defined forming the bore 30 extending partially through the solid bar stock. Furthermore, the step of forming the bore 30 extending partially through the elongated member 22 is further defined as forming the bore 30 extending through about three-quarters of the length L of the elongated member 22 from the second end 26 toward the first end 24, as shown in FIGS. 11 and 12. Said differently, the elongated member 22 does not define the bore 30 entirely along the length L of the elongated member 22, such that the first end 24 is solid. The step of forming the bore 30 may be performed by drilling partially through the elongated member 22. It is to be appreciated the step of forming the bore 30 may be performed by any suitable material removal process, such as piercing.

Typically, the step of forming the bore 30 occurs prior to the step of forming the flange 28. However, it is to be appreciated that the step of forming the bore 30 may occur after to the step of forming the flange 28.

The process may further include the step of rotary-cutting the exterior 44 of the elongated member 22 about and along the axis A to remove the portion of the material from the exterior 44 of the elongated member 22. The step of rotary-cutting is typically referred to as turning which is typically performed on the lathe. Rotary-cutting the exterior 44 of the elongated member 22 cylindrically configures the exterior 44 such that the outer radius is equal about the axis A. It is to be appreciated that rotary-cutting may be performed by any suitable material removal process.

Typically, the step of rotary-cutting the exterior 44 of the elongated member 22 occurs prior to the step of forming the flange 28. It is to be appreciated that the step of rotary-cutting the exterior 44 of the elongated member 22 may occur after the step of forming the flange 28.

The step of forming the flange 28 with the material at the first end 24 typically involves deforming the material at the first end 24 of the elongated member 22, and is shown in FIGS. 7 and 9. The step of forming the flange 28 may be performed by forging the first end 24. Said differently, the flange 28 is formed from the material at the first end 24 by applying the localized compressive force to the first end 24. It is to be appreciated that the step of forming the flange 28 may be performed by any suitable process, including, but not limited to, rolling, spinning, upsetting, and rotary swaging. Typically, the application of the localized compressive force is along the axis A which moves the material at the first end 24 radially toward and/or away from the axis A. As such, the length L of the elongated member 22 prior to the step of forging the first end 24 is typically longer than the length L of the elongated member 22 following the step of forging the first end 24 because the material of the first end 24 has been radially displaced toward and/or away from the axis A.

The step of forging the flange 28 may be performed by horizontally forging the first end 24. Horizontal forging is typically performed by at least one die which moves horizontally to apply the localized compressive force. Horizontal forging may be performed by (but is not limited to performance by) the horizontal hydraulic press, the horizontal mechanical press, the horizontal screw press, and the horizontal hammer press.

The step of forging the flange 28 may be performed by vertically forging the first end 24. Vertical forging is typically performed by at least one die which moves vertically to apply the localized compressive force. Vertical forging may be performed by (but is not limited to performance by) the vertical hydraulic press, the vertical mechanical press, the vertical screw press, and the vertical hammer press.

It is to be appreciated that the step of forming the flange 28 may comprise multiple steps. As a non-limiting example, when the step of forming the flange 28 is performed by forging, the localized compressive force may be applied to the first end 24 more than once. As another non-limiting example, the step of forming the flange 28 may involve both forging as well as another forming process. As yet another non-limiting example, the step of forging may involve both vertical forging and horizontal forging.

When the process comprises the step of providing the elongated member 22 comprising the material and defining the bore 30, it may be advantageous to thicken the material of the elongated member 22 at the first end 24 to facilitate the forming of the flange 28. As such, the process may further comprise the step of gathering the material at the first end 24 to increase the cross-sectional thickness of the material at the first end 24 prior to the step of forming the flange 28 with the material at the first end 24, as shown in FIGS. 5, 6, and 8. The step of gathering the material typically involves moving the material of the elongated member 22 to increase the cross-sectional thickness of the material at the first end 24.

The step of gathering the material at the first end 24 may be further defined as upsetting the first end 24 to thicken the material of the elongated member 22 about the axis A at the first end 24, as shown in FIGS. 6 and 8. The step of upsetting the first end 24 is typically defined as applying the load along the axis A at the first end 24. The application of the load along the axis A moves the material at the first end 24 radially away from the axis A. As such, the length L of the elongated member 22 prior to the step of upsetting the first end 24 is typically longer than the length L of the elongated member 22 following the step of upsetting the first end 24 because the material of the first end 24 has been radially displaced away from the axis A. It is to be appreciated that the step of upsetting the first end 24 may be further defined as applying the load along the axis A and another load transverse to the axis A.

The step of upsetting the first end 24 may be further defined as upsetting the first end 24 to move the material toward the axis A and fill the bore 30 at the first end 24, as shown in FIG. 6. Said differently, the step of upsetting the first end 24 moves the material of the elongated member 22, radially configured about the axis A, inward toward the axis A such that the material about the axis A converges to abut at the axis A. Alternatively, the step of upsetting the first end 24 may move the material toward, but not entirely to, the axis A, as shown in FIG. 8. As such, the bore 30 is not filled at the first end 24. The inner radius of the elongated member 22 is smaller at the first end 24 than the middle portion 34.

Returning to FIGS. 6 and 8, the step of upsetting the first end 24 may be further defined as electrically upsetting the first end 24 to increase the cross-sectional thickness of the material at the first end 24. During the step of electrical upsetting, the high current is passed into the first end 24 of the elongated member 22. Electrical resistance within the material of the elongated member 22 at the first end 24 causes the first end 24 to heat up. The load is then applied along the axis A at the first end 24. The step of electrically upsetting the first end 24 is typically performed by abutting the first end 24 of the elongated member 22 against the plate with the plate electrified by the high current. The elongated member 22 may move along the axis A toward the plate to apply the load to the first end 24. Alternatively, the plate may move along the axis A toward the elongated member 22 to apply the load to the first end 24. The application of the load along the axis A moves the material at the first end 24 radially away from the axis A. As such, the length L of the elongated member 22 prior to the step of electrically upsetting the first end 24 is typically longer than the length L of the elongated member 22 following the step of electrically upsetting the first end 24 because the material of the first end 24 has been radially displaced away from the axis A. It is to be appreciated that the step of electrically upsetting the first end 24 may be further defined as applying the load along the axis A and the another load transverse to the axis A.

The step of electrically upsetting the first end 24 may be further defined as electrically upsetting the first end 24 to move the material toward the axis A and fill the bore 30 at the first end 24, as shown in FIG. 6. Said differently, the step of electrically upsetting the first end 24 moves the material of the elongated member 22, radially configured about the axis A, inward toward the axis A such that the material about the axis A converges to abut at the axis A. Alternatively, the step of electrically upsetting the first end 24 may move the material toward, but not entirely to, the axis A, as shown in FIG. 8. As such, the bore 30 is not filled at the first end 24. The inner radius of the elongated member 22 is smaller at the first end 24 than the middle portion 34.

The step of gathering the material at the first end 24 may be performed by radial forging, as shown in FIG. 5. The step of radial forging is typically performed by inserting the mandrel into the bore 30 at the first end 24 of the elongated member 22; however, it is to be appreciated that the step of radial forging may be performed without the use of the mandrel. The step of radial forging is typically performed by the plurality of dies encircling the first end 24 of the elongated member 22 with the plurality of dies striking the exterior 44 to deform the material at the first end 24 toward the axis A as the elongated member 22 rotates about the axis A. It is to be appreciated that the plurality of dies may rotate about the axis A and strike the exterior 44 to deform the material at the first end 24 toward the axis A while the elongated member 22 stays stationary. The step of radial forging may be further performed by the wall abutting the first end 24 of the elongated member 22. The elongated member 22 may move along the axis A toward the wall to apply the load to the first end 24 along the axis A to radially displace and further thicken the material away from the axis A at the first end 24. Alternatively, the wall may move along the axis A toward the elongated member 22 to apply the load to the first end 24. As such, the length L of the elongated member 22 prior to the step of radial forging the first end 24 may be longer than the length L of the elongated member 22 following the step of radial forging the first end 24 because the material of the first end 24 has been radially displaced away from the axis A.

Typically, the step of radial forging the first end 24 may move the material toward, but not entirely to, the axis A. As such, the bore 30 is not filled at the first end 24. The inner radius of the elongated member 22 is smaller at the first end 24 than the middle portion 34. It is to be appreciated that the step of radial forging the first end 24 may move the material toward the axis A and fill the bore 30 at the first end 24. Said differently, the step of radial forging the first end 24 moves the material of the elongated member 22, radially configured about the axis A, inward toward the axis A such that the material about the axis A converges to abut at the axis A.

The step of radial forging the first end 24 may be performed at the temperature substantially equal to the temperature of the ambient air. When the radial forging is performed at the temperature substantially equal to the temperature of the ambient air, the step of radial forging is typically referred to as cold swaging.

The process may further comprise the step of heating the first end 24 of the elongated member 22 from about 1,200 to 2,300° F. prior to the step of radial forging the first end 24. When the first end 24 of the elongated member 22 is heated from about 1,200 to 2,300° F. prior to the step of radial forging the first end 24, the step of radial forging is typically referred to as hot rotary forging. Preferably, the step of heating the first end 24 of the elongated member 22 from about 1,200 to about 2,300° F. may be further defined as heating the first end 24 of the elongated member 22 from about 1,800 to about 2,300° F.

The step of upsetting the first end 24 described above may be the sole process of performing the step of gathering the material at the first end 24. Similarly, the step of radial forging the first end 24 may be the sole process of performing the step of gathering the material at the first end 24. Alternatively, the step of gathering the material at the first end 24 may be performed by radial forging, as shown in FIG. 5, and then upsetting the first end 24 to thicken the material of the elongated member 22 about the axis A at the first end 24, as shown in FIGS. 6 and 8.

When the step of gathering the material at the first end 24 is performed by radial forging and then upsetting the first end 24, the step of radial forging is equivalent to the step of radial forging the first end 24 as the sole process of performing the step of gathering the material at the first end 24, as described above. Furthermore, when the step of gathering the material at the first end 24 is performed by radial forging and then upsetting the first end 24, the step of upsetting the first end 24 may be further defined as upsetting the first end 24 to move the material toward the axis A and fill the bore 30 at the first end 24, as shown in FIG. 6. The step of upsetting the first end 24 to move the material toward the axis A and fill the bore 30 at the first end 24, used in the context of following the step of radial forging, is equivalent to the step of upsetting the first end 24 to move the material toward the axis A and fill the bore 30 at the first end 24, used in the context of the sole process of performing the step of gathering the material at the first end 24, and has been described in greater detail above.

It is to be appreciated that the step of upsetting the first end 24 may move the material toward, but not entirely to, the axis A, as shown in FIG. 8. As such, the bore 30 may not be filled at the first end 24.

Returning to FIGS. 6 and 8, when the step of gathering the material at the first end 24 is performed by radial forging and then upsetting the first end 24, the step of upsetting the first end 24 may be further defined as electrically upsetting the first end 24 to increase the cross-sectional thickness of the material at the first end 24. The step of electrically upsetting the first end 24 to increase the cross-sectional thickness of the material at the first end 24, used in the context of following the step of radial forging, is equivalent to the step of electrically upsetting the first end 24 to increase the cross-sectional thickness of the material at the first end 24, used in the context of the sole process of performing the step of gathering the material at the first end 24, and has been described in greater detail above.

When the step of gathering the material at the first end 24 is performed by radial forging and then upsetting the first end 24, the step of electrically upsetting the first end 24 may be further defined as electrically upsetting the first end 24 to move the material toward the axis A and fill the bore 30 at the first end 24, as shown in FIG. 6. The step of electrically upsetting the first end 24 to move the material toward the axis A and fill the bore 30 at the first end 24, used in the context of following the step of radial forging, is equivalent to the step of electrically upsetting the first end 24 to move the material toward the axis A and fill the bore 30 at the first end 24, used in the context of the sole process of performing the step of gathering the material at the first end 24, and has been described in greater detail above.

The step of electrically upsetting the first end 24 may move the material toward, but not entirely to, the axis A, as shown in FIG. 8. As such, the bore 30 may not be filled at the first end 24.

As described above, the step of gathering the material at the first end 24 is performed by radial forging, which precedes the step of upsetting the first end 24. It is to be appreciated that the step of gathering the material at the first end 24 may be performed by upsetting the first end 24, which precedes the step of radial forging the first end 24.

The step of gathering the material of the elongated member 22 at the first end 24 increases the cross-sectional thickness of the material at the first end 24. By thickening the material at the first end 24, the first and transition surfaces 36, 42 are formed with the first and third cross-sectional thicknesses T1, T3 of the material greater than the middle cross-sectional thickness M of the material.

The hollow axle shaft 20 may further include the cap 56 disposed in the bore 30 at the first end 24. The process may further comprise the step of inserting the cap 56 into the bore 30 at the first end 24, as shown in FIG. 9. The cap 56 typically has the cylindrical configuration and is press fit into the bore 30 of the elongated member 22 at the first end 24 to close the bore 30 of the elongated member 22 at the first end 24.

The step of gathering the material at the first end 24 to thicken the material of the elongated member 22 about the axis A at the first end 24, as described above, may occur prior to the step of inserting the cap 56 in the bore 30 at the first end 24. Typically, the cap 56 is inserted when the step of gathering the material at the first end 24 does not fill the bore 30 at the first end 24. Furthermore, the step of inserting the cap 56 in the bore 30 may occur after the step of forming the flange 28. It is to be appreciated that the step of inserting the cap 56 in the bore 30 may occur prior to the step of gathering the material at the first end 24 and the step of forming the flange 28.

The hollow axle shaft 20 may include the spline region 58 at the second end 26. The spline region 58 is the portion of the elongated member 22 at the second end 26 from which the plurality of splines 52 may be formed. The process may further comprise the step of forming the spline region 58 with the material of the elongated member 22 at the second end 26, as shown in FIGS. 7 and 9.

The step of forming the spline region 58 may be performed by forging the second end 26. Said differently, the spline region 58 is formed from the material at the second end 26 by applying the localized compressive force to the second end 26. It is to be appreciated that the step of forming the spline region 58 may be performed by any suitable process, including, but not limited to, rolling, spinning, upsetting, and rotary swaging. Typically, the application of the localized compressive force is along the axis A which moves the material at the second end 26 radially toward and/or away from the axis A. As such, the length L of the elongated member 22 prior to the step of forging the second end 26 is typically longer than the length L of the elongated member 22 following the step of forging the second end 26 because the material of the second end 26 has been radially displaced toward and/or away from the axis A.

The step of forging the spline region 58 may be performed by horizontally forging the second end 26. As described above regarding the step of forging the flange 28, horizontal forging is typically performed by at least one die which moves horizontally to apply the localized compressive force. Horizontal forging may be performed by (but is not limited to performance by) the horizontal hydraulic press, the horizontal mechanical press, the horizontal screw press, and the horizontal hammer press.

The step of forging the spline region 58 may be performed by vertically forging the second end 26. As described above regarding the step of forging the flange 28, vertical forging is typically performed by at least one die which moves vertically to apply the localized compressive force. Vertical forging may be performed by (but is not limited to performance by) the vertical hydraulic press, the vertical mechanical press, the vertical screw press, and the vertical hammer press.

It is to be appreciated that the step of forming the spline region 58 may comprise multiple steps. As a non-limiting example, when the step of forming the spline region 58 is performed by forging, the localized compressive force may be applied to the second end 26 more than once. As another non-limiting example, the step of forming the spline region 58 may involve both forging as well as another forming process. As yet another non-limiting example, the step of forging may involve both vertical forging and horizontal forging.

The hollow axle shaft 20 may include the plurality of splines 52 at the second end 26 with the splines 52 extending radially away from the axis A for coupling the hollow axle shaft 20 to the prime mover, as shown in FIGS. 2A and 2B. The process may further comprise the step of forming the plurality of splines 52 with the spline region 58 at the second end 26. Typically, the step of forming the plurality of splines 52 is performed by rolling the spline region 58. It is to be appreciated that the step of forming the plurality of splines 52 may be performed by any suitable process, including, but not limited to, swaging and forging.

As described above, the hollow axle shaft 20 may include the plurality of splines 52. To facilitate the forming of the plurality of splines 52, it may be advantageous to thicken the material of the elongated member 22 at the second end 26. As such, the process may further comprise the step of gathering the material at the second end 26 to increase the cross-sectional thickness of the material at the second end 26, as shown in FIGS. 4 and 12. The step of gathering the material typically involves moving the material of the elongated member 22 to increase the cross-sectional thickness of the material at the second end 26.

The step of gathering the material at the second end 26 may be performed by radial forging. Similar to the step of radial forging the first end 24 described above, the step of radial forging is typically performed by inserting the mandrel into the bore 30 at the second end 26 of the elongated member 22; however, it is to be appreciated that the step of radial forging may be performed without the use of the mandrel. The step of radial forging may be further performed by the plurality of dies encircling the second end 26 of the elongated member 22 with the plurality of dies striking the exterior 44 to deform the material at the second end 26 toward the axis A as the elongated member 22 rotates about the axis A. It is to be appreciated that the plurality of dies may rotate about the axis A and strike the exterior 44 to deform the material at the first end 24 toward the axis A while the elongated member 22 stays stationary. The step of radial forging may be further performed by the wall abutting the second end 26 of the elongated member 22. The elongated member 22 may move along the axis A toward the wall to apply the load to the second end 26 along the axis A to radially displace and further thicken the material away from the axis A at the second end 26. Alternatively, the wall may move along the axis A toward the elongated member 22 to apply the load to the second end 26. As such the length L of the elongated member 22 prior to the step of radial forging the second end 26 may be longer than the length L of the elongated member 22 following the step of radial forging the second end 26 because the material of the second end 26 has been radially displaced away from the axis A.

Typically, the step of radial forging the second end 26 may move the material toward, but not entirely to, the axis A. As such, the bore 30 is not filled at the second end 26. The inner radius of the elongated member 22 is smaller at the second end 26 than the middle portion 34. It is to be appreciated that the step of radial forging the second end 26 may move the material toward the axis A and fill the bore 30 at the second end 26. Said differently, the step of radial forging the second end 26 moves the material of the elongated member 22, radially configured about the axis A, inward toward the axis A such that the material about the axis A converges to abut at the axis A.

The step of radial forging the second end 26 may be performed at the temperature substantially equal to the temperature of the ambient air. The process may further comprise the step of heating the second end 26 of the elongated member 22 from about 1,200 to 2,300° F. prior to the step of radial forging the second end 26. Preferably, the step of heating the second end 26 of the elongated member 22 from about 1,200 to about 2,300° F. may be further defined as heating the second end 26 of the elongated member 22 from about 1,800 to about 2,300° F.

The steps of gathering the material of the elongated member 22 at the second end 26 increases the cross-sectional thickness of the material at the second end 26. By thickening the material at the second end 26, the second surface 40 is formed with the second cross-sectional thickness T2 of the material greater than the middle cross-sectional thickness of the material M.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of manufacturing a hollow axle shaft for transmitting rotational motion from a prime mover to a wheel of a vehicle, with the hollow axle shaft including an elongated member extending along an axis between a first end and a second end and defining a bore extending along the axis between the first and second ends, with the hollow axle shaft including a flange at the first end extending radially away from the axis for receiving the wheel, and with the hollow axle shaft including a cap disposed in the bore at the first end; said method comprising the steps of:
providing the elongated member comprising a material and defining the bore;
forming the flange with the material at the first end;
gathering the material at the first end to thicken the material of the elongated member about the axis at the first end; and
inserting the cap into the bore at the first end after the step of gathering the material at the first end.

2. The method as set forth in claim 1 further comprising the step of gathering the material at the first end to increase a cross-sectional thickness of the material at the first end prior to the step of forming the flange with the material at the first end.

3. The method as set forth in claim 2 wherein the step of gathering the material at the first end is further defined as upsetting the first end to thicken the material of the elongated member about the axis at the first end.

4. The method as set forth in claim 3 wherein the step of upsetting the first end is further defined as electrically upsetting the first end to increase a cross-sectional thickness of the material at the first end.

5. The method as set forth in claim 2 wherein the step of gathering the material at the first end is performed by radial forging.

6. The method as set forth in claim 5 wherein the step of gathering the material at the first end is performed by radial forging and then upsetting the first end to thicken the material of the elongated member about the axis at the first end.

7. The method as set forth in claim 6 wherein the step of upsetting the first end is further defined as electrically upsetting the first end to increase a cross-sectional thickness of the material at the first end.

8. The method as set forth in claim 5 further comprising the step of heating the first end of the elongated member from about 1,200 to 2,300° F. prior to the step of radial forging the first end.

9. The method as set forth in claim 8 wherein the step of heating the first end of the elongated member from about 1,200 to about 2,300° F. is further defined as heating the first end of the elongated member from about 1,800 to about 2,300° F.

10. The method as set forth in claim 1 further comprising the step of gathering the material at the second end to increase a cross-sectional thickness of the material at the second end.

11. The method as set forth in claim 10 further comprising the step of gathering the material at the first end to increase a cross-sectional thickness of the material at the first end prior to the step of forming the flange with the material at the first end.

12. The method as set forth in claim 10 wherein the step of gathering the material at the second end is performed by radial forging.

13. The method as set forth in claim 12 further comprising the step of heating the second end of the elongated member from about 1,200 to 2,300° F. prior to the step of radial forging the second end.

14. The method as set forth in claim 13 wherein the step of heating the second end of the elongated member from about 1,200 to about 2,300° F. is further defined as heating the second end of the elongated member from about 1,800 to about 2,300° F.

15. The method as set forth in claim 1 wherein the step of inserting the cap in the bore occurs after the step of forming the flange.

16. The method as set forth in claim 1 wherein the step of forming the flange is performed by forging the first end.

17. The method as set forth in claim 16 wherein the step of forging the flange is performed by horizontally forging the first end.

18. The method as set forth in claim 16 wherein the step of forging the flange is performed by vertically forging the first end.

19. The method as set forth in claim 1 wherein the hollow axle shaft includes a spline region at the second end and further comprising the step of forming the spline region with the material at the second end.

20. The method as set forth in claim 19 wherein the step of forming the spline region is performed by forging the second end.

21. The method as set forth in claim 20 wherein the step of forging the spline region is performed by horizontally forging the second end.

22. The method as set forth in claim 20 wherein the step of forging the spline region is performed by vertically forging the second end.

23. The method as set forth in claim 19 wherein the hollow axle shaft includes a plurality of splines at the second end with the splines extending radially away from the axis for coupling the hollow axle shaft to the prime mover and further comprising the step of forming the splines with the spline region at the second end.

24. A method of manufacturing a hollow axle shaft for transmitting rotational motion from a prime mover to a wheel of a vehicle, with the hollow axle shaft including an elongated member extending along an axis between a first end and a second end and defining a bore extending along the axis between the first and second ends, and with the hollow axle shaft including a flange at the first end extending radially away from the axis for receiving the wheel; said method comprising the steps of:
providing the elongated member comprising a material and defining the bore; radial forging the first end to thicken the material of the elongated member about the axis at the first end;
upsetting the second end to thicken the material of the elongated member about the axis at the second end;
forming a spline region with the material at the second end;
electrically upsetting the first end to thicken the material of the elongated member about the axis at the first end; and
forging the first end to form the flange.

25. A method of manufacturing a hollow axle shaft for transmitting rotational motion from a prime mover to a wheel of a vehicle, with the hollow axle shaft including an elongated member extending along an axis between a first end and a second end and defining a bore extending along the axis between the first and second ends, with the hollow axle shaft including a flange at the first end extending radially away from the axis for receiving the wheel, and with the hollow axle shaft including a cap disposed in the bore at the first end; said method comprising the steps of:
providing the elongated member comprising a material and defining the bore;
forming the flange with the material at the first end;
inserting the cap into the bore at the first end;
heating the second end of the elongated member from about 1,200 to 2,300° F.; and
gathering the material at the second end by upsetting the second end, after the step of heating the second end of the elongated member, to increase a cross-sectional thickness of the material at the second end.

26. The method as set forth in claim 25 further comprising the step of gathering the material at the first end to increase a cross-sectional thickness of the material at the first end prior to the step of forming the flange with the material at the first end.

27. The method as set forth in claim 26 wherein the step of gathering the material at the first end is further defined as upsetting the first end to thicken the material of the elongated member about the axis at the first end.

28. The method as set forth in claim 27 wherein the step of upsetting the first end is further defined as electrically upsetting the first end to increase a cross-sectional thickness of the material at the first end.

29. The method as set forth in claim 26 wherein the step of gathering the material at the first end is performed by radial forging.

30. The method as set forth in claim 29 wherein the step of gathering the material at the first end is performed by radial forging and then upsetting the first end to thicken the material of the elongated member about the axis at the first end.

31. The method as set forth in claim 30 wherein the step of upsetting the first end is further defined as electrically upsetting the first end to increase a cross-sectional thickness of the material at the first end.

32. The method as set forth in claim 29 further comprising the step of heating the first end of the elongated member from about 1,200 to 2,300° F. prior to the step of radial forging the first end.

33. The method as set forth in claim 32 wherein the step of heating the first end of the elongated member from about 1,200 to about 2,300° F. is further defined as heating the first end of the elongated member from about 1,800 to about 2,300° F.

34. The method as set forth in claim 25 further comprising the step of gathering the material at the first end to increase a cross-sectional thickness of the material at the first end prior to the step of forming the flange with the material at the first end.

35. The method as set forth in claim 25 wherein the step of inserting the cap in the bore occurs after the step of forming the flange.

36. The method as set forth in claim 25 wherein the step of forming the flange is performed by forging the first end.

37. The method as set forth in claim 36 wherein the step of forging the flange is performed by horizontally forging the first end.

38. The method as set forth in claim 36 wherein the step of forging the flange is performed by vertically forging the first end.

39. The method as set forth in claim 25 wherein the hollow axle shaft includes a spline region at the second end and further comprising the step of forming the spline region with the material at the second end.

40. The method as set forth in claim 39 wherein the step of forming the spline region is performed by forging the second end.

41. The method as set forth in claim 40 wherein the step of forging the spline region is performed by horizontally forging the second end.

42. The method as set forth in claim 40 wherein the step of forging the spline region is performed by vertically forging the second end.

43. The method as set forth in claim 39 wherein the hollow axle shaft includes a plurality of splines at the second end with the splines extending radially away from the axis for coupling the hollow axle shaft to the prime mover and further comprising the step of forming the splines with the spline region at the second end.

44. A method of manufacturing a hollow axle shaft for transmitting rotational motion from a prime mover to a wheel of a vehicle, with the hollow axle shaft including an elongated member extending along an axis between a first end and a second end and defining a bore extending along the axis between the first and second ends, with the hollow axle shaft including a flange at the first end extending radially away from the axis for receiving the wheel, and with the hollow axle shaft including a cap disposed in the bore at the first end; said method comprising the steps of:
providing the elongated member comprising a material and defining the bore;
forming the flange with the material at the first end;
inserting the cap into the bore at the first end;
heating the second end of the elongated member from about 1,800 to about 2,300° F.; and
gathering the material at the second end by upsetting the second end, after the step of heating the second end of the elongated member, to increase a cross-sectional thickness of the material at the second end.

45. The method as set forth in claim 44 wherein the hollow axle shaft includes a spline region at the second end and further comprising the step of forming the spline region with the material at the second end.

46. A method of manufacturing a hollow axle shaft for transmitting rotational motion from a prime mover to a wheel of a vehicle, with the hollow axle shaft including an elongated member extending along an axis between a first end and a second end and defining a bore extending along the axis between the first and second ends, with the hollow axle shaft including a flange at the first end extending radially away from the axis for receiving the wheel, and with the hollow axle shaft including a cap disposed in the bore at the first end; said method comprising the steps of:
providing the elongated member comprising a material and defining the bore;
forming the flange with the material at the first end;
gathering the material at the first end to thicken the material of the elongated member about the axis at the first end; and
inserting the cap into the bore at the first end.

47. The method as set forth in claim 46 further comprising the step of gathering the material at the first end to increase a cross-sectional thickness of the material at the first end prior to the step of forming the flange with the material at the first end.

48. The method as set forth in claim 47 wherein the step of gathering the material at the first end is further defined as upsetting the first end to thicken the material of the elongated member about the axis at the first end.

49. The method as set forth in claim 48 wherein the step of upsetting the first end is further defined as electrically upsetting the first end to increase a cross-sectional thickness of the material at the first end.

50. The method as set forth in claim 47 wherein the step of gathering the material at the first end is performed by radial forging.

51. The method as set forth in claim 50 wherein the step of gathering the material at the first end is performed by radial forging and then upsetting the first end to thicken the material of the elongated member about the axis at the first end.

52. The method as set forth in claim 51 wherein the step of upsetting the first end is further defined as electrically upsetting the first end to increase a cross-sectional thickness of the material at the first end.

53. The method as set forth in claim 50 further comprising the step of heating the first end of the elongated member from about 1,200 to 2,300° F. prior to the step of radial forging the first end.

54. The method as set forth in claim 53 wherein the step of heating the first end of the elongated member from about 1,200 to about 2,300° F. is further defined as heating the first end of the elongated member from about 1,800 to about 2,300° F.

55. The method as set forth in claim 46 further comprising the step of gathering the material at the second end to increase a cross-sectional thickness of the material at the second end.

56. The method as set forth in claim 55 further comprising the step of gathering the material at the first end to increase a cross-sectional thickness of the material at the first end prior to the step of forming the flange with the material at the first end.

57. The method as set forth in claim 55 wherein the step of gathering the material at the second end is performed by radial forging.

58. The method as set forth in claim 57 further comprising the step of heating the second end of the elongated member from about 1,200 to 2,300° F. prior to the step of radial forging the second end.

59. The method as set forth in claim 58 wherein the step of heating the second end of the elongated member from about 1,200 to about 2,300° F. is further defined as heating the second end of the elongated member from about 1,800 to about 2,300° F.

60. The method as set forth in claim 46 wherein the step of inserting the cap in the bore occurs after the step of forming the flange.

61. The method as set forth in claim 46 wherein the step of forming the flange is performed by forging the first end.

62. The method as set forth in claim 61 wherein the step of forging the flange is performed by horizontally forging the first end.

63. The method as set forth in claim 61 wherein the step of forging the flange is performed by vertically forging the first end.

64. The method as set forth in claim 46 wherein the hollow axle shaft includes a spline region at the second end and further comprising the step of forming the spline region with the material at the second end.

65. The method as set forth in claim 64 wherein the step of forming the spline region is performed by forging the second end.

66. The method as set forth in claim 65 wherein the step of forging the spline region is performed by horizontally forging the second end.

67. The method as set forth in claim 65 wherein the step of forging the spline region is performed by vertically forging the second end.

68. The method as set forth in claim 64 wherein the hollow axle shaft includes a plurality of splines at the second end with the splines extending radially away from the axis for coupling the hollow axle shaft to the prime mover and further comprising the step of forming the splines with the spline region at the second end.

* * * * *